Sept. 21, 1965
R. W. MINNICH
3,207,040
CUTTING TOOL
Filed Sept. 3, 1963
2 Sheets-Sheet 1
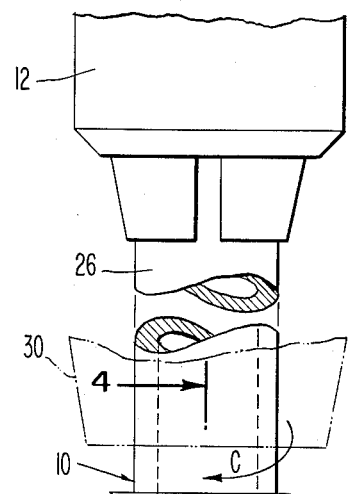
Fig.3
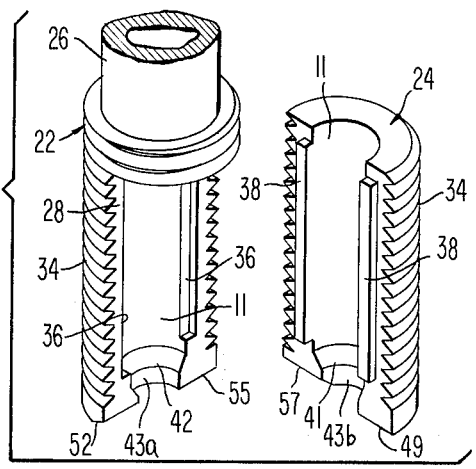
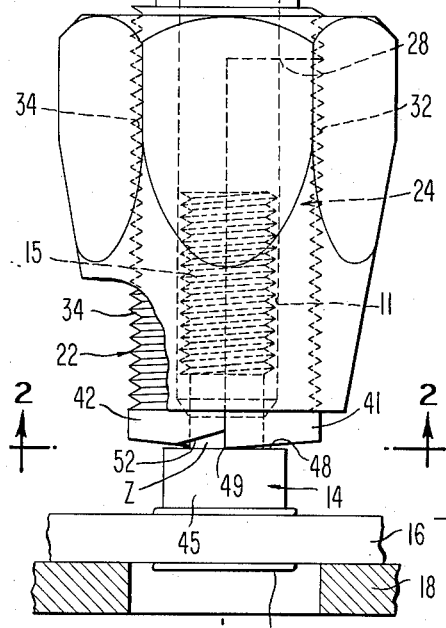
Fig.1
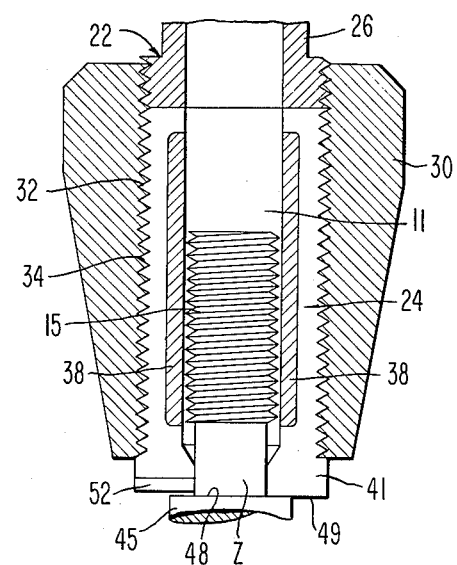
Fig.4
Fig.5
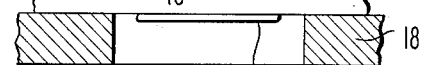
Fig.2
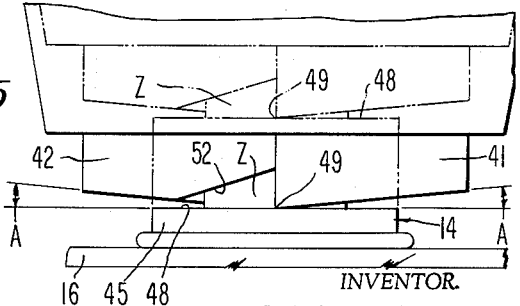
INVENTOR.
RICHARD W. MINNICH
BY
William R. Nolte
AGENT Sept. 21, 1965  R. W. MINNICH  3,207,040
CUTTING TOOL
Filed Sept. 3, 1963  2 Sheets-Sheet 2
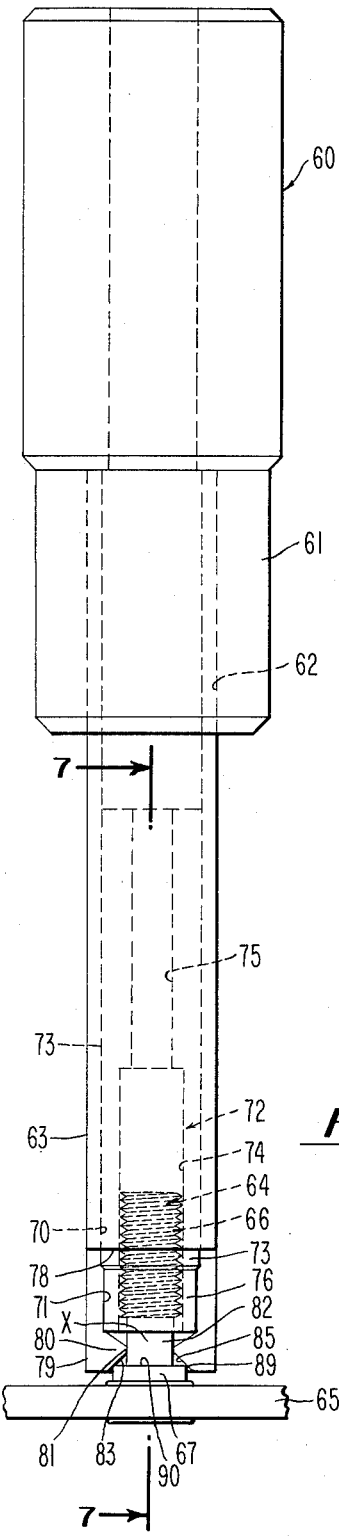
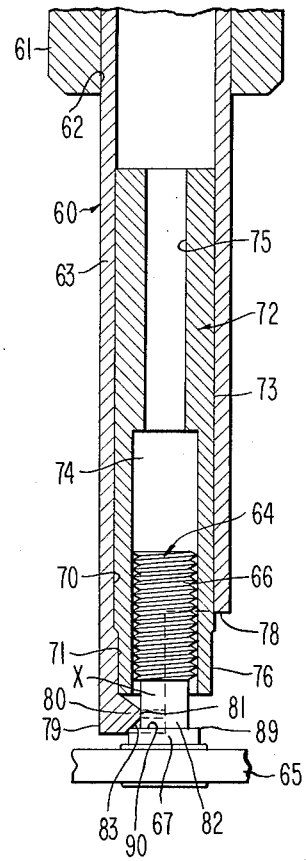
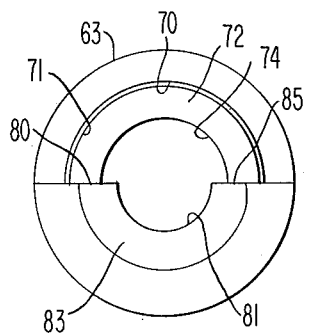
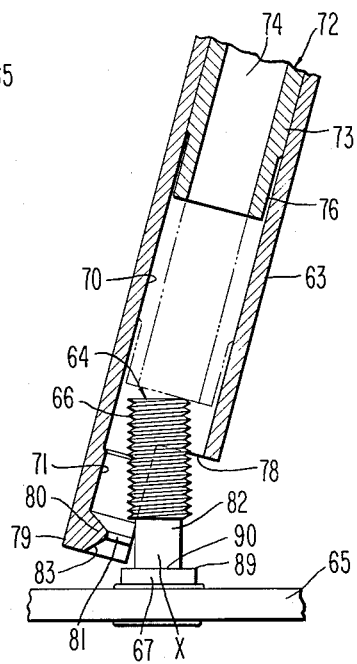
Fig.6
Fig.7
Fig.8
Fig.9
INVENTOR.
RICHARD W. MINNICH
BY William R. Nolte
AGENT

United States Patent Office

3,207,040
Patented Sept. 21, 1965

3,207,040
CUTTING TOOL
Richard W. Minnich, Collegeville, Pa., assignor to Burroughs Corporation, Detroit, Mich., a corporation of Michigan
Filed Sept. 3, 1963, Ser. No. 306,257
5 Claims. (Cl. 90—12)

This invention relates to cutting tools and particularly to multiple part tools of hollow construction for enclosing a portion of the workpiece while performing other operations thereon, e.g., machining the same.

In some instances it has been found desirable to perform certain additional machining operations upon a workpiece after the same has been fastened in place to its supporting structure. Due to such fastening, which may be of permanent form, the workpiece may not be readily removed from the structure to be placed in a lathe fixture, for example, or equivalent set-up. Such operations have required machining a smaller diameter behind a larger diameter of the workpiece with the same so mounted upon its supporting structure.

The present invention accomplishes such operations by providing means at one end of the cutting tool enabling the same to be gripped for rotation. In one form of the invention the tool may be disposed for rotation as by an electric drill and in another form may be rotated by hand. The cutting tool includes an assembly of components which are so constructed and related as to enclose an enlarged portion of the workpiece while machining an undercut portion which lies adjacent said enlarged portion. For this purpose insert means are provided to secure the cutter tool around the enlarged end of the workpiece, and serve in addition to axially align the cutter tool as the same is rotated about the axis of the workpiece. One form of the invention further contemplates that the cutter tool grip the workpiece in its undercut portion in full bearing so that the tool is automatically aligned with the workpiece by means of such bearing alignment.

Accordingly, it is an object of this invention to provide a novel cutting tool capable of self alignment.

It is a further object of the invention to provide a novel cutting tool capable of being assembled around one portion of a workpiece and to rotate in bearing relation about a second reduced portion of the workpiece to insure correct alignment of the tool while enlarging said second area.

For a better understanding of the present invention, together with other and further objects thereof, reference is had to the following description taken in connection with the accompanying drawings and its scope will be pointed out in the appended claims.

FIG. 1 is an elevational view of the cutting tool assembled around a workpiece in accordance with the principles of the present invention;

FIG. 2 is a sectional view taken along the line 2—2 of FIG. 1;

FIG. 3 is an exploded view of the lower portions of the cutter tool without the nut which normally retains the portions in assembled relationship removed;

FIG. 4 is a sectional view taken along the line 4—4 of FIG. 1, and showing the lower portions of the cutting tool assembled in cutting relationship around an end portion of the workpiece;

FIG. 5 is a greatly enlarged view of the lower portions of the cutting tool showing the same in successive cutting positions along the workpiece;

FIG. 6 is an enlarged elevational view of a modified form of my invention;

FIG. 7 is a partial sectional view taken along the line 7—7 of FIG. 6;

FIG. 8 is a partial sectional view similar to that shown in FIG. 7 with the tool tilted to permit engagement or disengagement of the same with the workpiece;

FIG. 9 is a bottom view of the cutting tool with the workpiece removed.

The principles of this invention are particularly useful when embodied in a cutting tool assembly such as illustrated in FIG. 1, generally indicated by the reference numeral 10. The cutting tool assembly 10 is shown mounted at its upper end in a chuck 12, which may be that of a small handtool in the form of an electric drill or alternatively, may be the chuck of a conventional drill press. The lower portion of the cutting assembly 10 is shown as including a bore 11 to permit the same to be assembled around the threaded end 15 of a stud or workpiece 14 which in turn is permanently secured to plates 16, 18 and headed to the former as at 20. The workpiece 14 when so secured does not readily lend itself to placement in a lathe or other similar external set-up should additional machining be required.

With reference to FIG. 3 the lower portion of the tool assembly 10 is shown as comprising a first cutting member 22 and an insert member 24 received in mating engagement therewith. The first cutter member 22 is shown provided with a straight shaft extension 26 which may be rigidly supported for rotation within the previously mentioned chuck 12 of a hand drill while the lower portion thereof includes a half-cylindrical cutaway or notch designated at 28 into which the insert member 24 is received. In order to retain the insert 24 in place a bonnet or enlarged nut 30, internally threaded as at 32, is shown in engagement with the contiguous threads 34 encircling the outer lower surface of member 22 and insert member 24.

With reference now to FIGS. 1 and 3 and with nut 30 unscrewed from threads 34 and moved to its upper dotted line position on the shaft, FIG. 1, the insert member 24 may be separated from mating engagement with the lower portion of member 22 of the tool assembly 10. The latter member includes a pair of elongated notches 36 parallel to the axis of and formed within the marginal edges of the bore. The insert member 24 includes a pair of similarly located elongated, raised key-like portions 38, which extend outwardly from the diametrical section forming the flat inner face of the semicylindrical shaped cutter insert 24. The raised portions 38 likewise extend parallel to the axis of the bore and along its marginal edges and are of a size to be dovetailed or fitted within the notches 36, as seen in FIG. 4, when the insert 24 is in assembled relationship with member 22.

As seen in FIGS. 2 and 3, the lowermost portions of member 22 and insert member 24 terminate in radially inward extending shoulder portions 41 and 42 respectively, which when the same are in abutting relationship as seen in FIG. 1, define the cylindrical bearing surfaces 43a and 43b. The stud or workpiece 14 is shown as including an open space provided by an annular shank or groove Z which is of a smaller diameter than the crest of the threads 15 and the diameter of the lower collar 45. The cylindrical bearing surface 43a, 43b of the shoulder portions engage the outer surface of the groove Z. The upper threaded portion 15 of the stud is however, of slightly smaller diameter than the internal bore 11 of the cutter assembly so that as the tool is rotated to cut into the top horizontal surface 48 of said collar the threads on the stud are not damaged thereby. Moreover, the bearing surfaces 43a, 43b defined by the radial, inwardly extending shoulder portions engage the cylindrical surface of the intermediate portion in full bearing relation and by the concentricity of such bearing relationship is effective to axially align the cutter assembly and allow the operation to be performed with the tool assembly mounted in an electric hand drill.

With reference now to FIG. 1, it is seen that upon rotation of the cutter assembly in the direction of arrow C, the cutting edge 49 of shoulder 41 of cutter insert 24 engages the top surface 48 of collar 45 on stud 14. The opposed shoulder portion 42 of the cutter is chamfered at 52 to provide clearance for the material removed during the cutting operation. In addition, the entire face of the shoulder member 41 is bevelled upwardly away from the horizontal cutting edge 49 through an angle A as indicated in FIG. 5. In a similar manner the shoulder 42 of cutter member 22 is formed with a cutting edge 55 shown in abutting relation to shoulder 41, FIG. 2, the latter likewise having a chamfered edge 57 adjacent to edge 55 and also bevelled away from said edge through angle A as seen in FIG. 5. With the above tool assembly placed in a drill press or hand drill and assembled around the workpiece in the manner as above described, upon exerting a slight downward pressure on the handle of the drill press or hand drill not shown, cutting of the shoulder is accomplished, to reduce the height of collar 45.

Referring now to FIG. 6, a further embodiment of the instant invention is illustrated. This embodiment permits the invention to be used to remove a burr from a workpiece by hand-turning the tool one or more revolutions. The structure of FIG. 6 comprises a tool 60 which has a cylindrical handle 61 with a bore 62 extending through the lower portion thereof. A hollow cylindrical shaped member 63 is secured as by press-fitting, or otherwise within the bore 62. The hollow member 63 is shown positioned vertically over a stud 64 which is permanently fixed within a plate 65 as previously described. The stud or workpiece 64 likewise includes a threaded upper end portion 66, a relief recess provided by an annular reduced shank or groove X which is of a smaller diameter than the threaded end portion 66 and an adjacent unthreaded lower portion forming a collar 67.

Referring now to FIGURE 7, the hollow cylindrical member 63 includes a major bore 70 and a minor bore 71 of reduced diameter concentric therewith. A shiftable hollow sleeve or insert member 72 having an outside diameter 73 is shown received within the cylindrical member 63, the same constituting a sliding fit with the bore 70 of member 63. The insert member 72 likewise includes a bore 74 in its lower end which is of a diameter slightly greater than that of the threaded end 66 of the stud 64 in order that the latter may be received therewithin. When so enclosed, the lower portion 76 of the sleeve 72 of reduced diameter rides within the minor bore 71 of the sleeve of the member 63.

With reference now to FIGURES 7 and 8, the lower portion of hollow cylindrical member 63 is shown notched as at 78. The notch is of semicylindrical form so that the remaining lower portion of the member 63 constitutes a semicylindrical appendage 79 which is contiguous with the central portion of the member 63. A shoulder portion 80 extends radially inwardly away from the appendage and terminates at its inner radius in a bearing surface 81, to engage with the cylindrical surface of the annular groove X of the workpiece in bearing. The inwardly extending shoulder portion 80 of the appendage further includes a chamfer bevel surface 83, to provide a recess for the cutting edge indicated at 85 which lies outside of the conical plane defined by the chamfer bevel 83, and toward the observer as indicated in FIGURE 9.

As seen in FIGURE 8, the lower end of the cutting tool 60 is shown placed in an inclined relationship relative to the axis of the stud 64. The insert member 72 is in upper position within the bore 73 of member 63 as a result of the tool having been inverted, prior to placement of the tool over the stud. The coefficient of friction of the insert member 72 in its mating bore is sufficient to keep the same in the upper position as shown. Thereafter when the tool 60 is positioned vertically so that the axis of the tool is concentric with the axis of the stud 64 the sleeve member 62 is free to travel downwardly in its bore to encircle the threaded end 66 of the stud. Thus with the tool positioned vertically over the stud, the sleeve 72 is interposed between the stud threads 66 and the outer rotatable cylindrical member 63, and facilitates proper protection to the threads while turning the chamfer tool. With a few revolutions of the tool by hand turning handle 61 and applying a slight downward pressure, burrs indicated as at 89 along the outer edge of the top surface 90 of the collar 67 may be removed.

While there have been described what are at present considered to be the preferred embodiments of this invention it will be obvious to those skilled in the art that various changes and modifications may be made thereto without departing from the invention, it is therefore aimed in the appended claims to cover all such changes and modifications as fell within the true spirit and scope of the invention.

What is claimed is:

1. In a cutting tool for machining an elongated cylindrical member having an intermediate portion of reduced diameter comprising, in combination: first and second complemental cutter portions assembled in abutting relationship to define an internal bore for enclosing one end portion of said cylindrical member, said complemental cutter portions including shoulder portions extending radially inwardly to encircle the intermediate portion of said elongated member of reduced diameter, each said shoulder portion including a cutter edge in facing relation to the other end portion of said elongated member, one said complemental cutter portion having an elongated end portion to be securely held in a chuck, and means encircling said first and second complemental portions to retain the same in cutting relationship around said one end of said member.

2. In a cutting tool for machining an elongated member having an intermediate portion of reduced diameter comprising in combination: first and second complemental cutter portions when assembled defining an internal bore for enclosing one end portion of said member, said internal bore being of greater length than said one end portion to permit axial movement therebetween, said complemental cutter portions including shoulder portions extending radially inwardly to encircle the intermediate portion of said reduced diameter of said elongated member, each said shoulder portion including a cutter edge in facing relation to the other end portion of said elongated member, one said complemental cutter portion having an elongated end to be securely held in a chuck, and, means encircling said first and second complemental portions to retain the same in cutting relationship around said one end of said member.

3. In a cutting tool for machining an elongated member having an intermediate portion of reduced diameter, comprising the combination: first and second complemental cutter portions when assembled in face to face relationship defining an internal bore for enclosing one end portion of said member, said internal bore being of greater length than said one end portion to permit axial movement therebetween, said complemental cutter portions including shoulder portions extending radially inwardly to encircle the intermediate portion of reduced diameter of said elongated member, said shoulder portions when combined being of a diameter to engage the intermediate portion of said member in full bearing, each said shoulder portion including a cutter edge in facing relation to the other end portion of said elongated member, one said complemental cutter portion having an elongated end portion to be securely held in a chuck, and, means encircling said complemental portions to retain the same in cutting relationship around said one end of said member.

4. In a cutting tool for machining an elongated member having an intermediate portion of reduced diameter comprising in combination: first and second complemental cutter portions defining an internal bore for enclosing one end portion of said member, each said complemental cutter portion including a radial inwardly extending shoulder portion for engaging the external surface of said intermediate portion of said member in bearing, tongue and groove means interconnecting said complemental cutter portions, each said shoulder portion including a cutter edge in facing relation to the other end portion of said elongated member, said first complemental cutter portion including another portion adapted to be securely held in a chuck for rotation of the same, and, means encircling said first and second complemental cutter portions to retain the same in cutting relationship around said one end and in bearing engagement about the intermediate portion of said member.

5. In a cutting tool for machining an elongated workpiece having an intermediate portion of reduced diameter comprising in combination: first and second complemental cutter members having an internal bore for enclosing one end portion of said workpiece, each said complemental cutter member including a radial inwardly extending shoulder portion for engaging the external surface of said intermediate portion of the workpiece in bearing, tongue and groove means interconnecting said complemental cutter members, each said shoulder portion including a cutter edge in facing relation to the other end portion of said elongated member, said first and second cutter members including a continuous thread encircling the same, said first complemental cutter portion including another portion adapted to be securely held in a chuck for rotation of the cutter members, and, threaded nut means engageable with the continuous thread encircling the cutter members for retaining the assembly of the same around the workpiece prior to machining and for disassembling the same after completion of said machining.

References Cited by the Examiner

UNITED STATES PATENTS

| | | |
|---|---|---|
| 661,554 | 11/00 | Roberts. |
| 2,993,418 | 7/61 | Doane _____ 90—12 |

WILLIAM W. DYER, Jr., *Primary Examiner.*